Jan. 31, 1950 L. S. BRENNAN 2,495,691
CONTROL UNIT
Filed Sept. 12, 1945 2 Sheets-Sheet 2

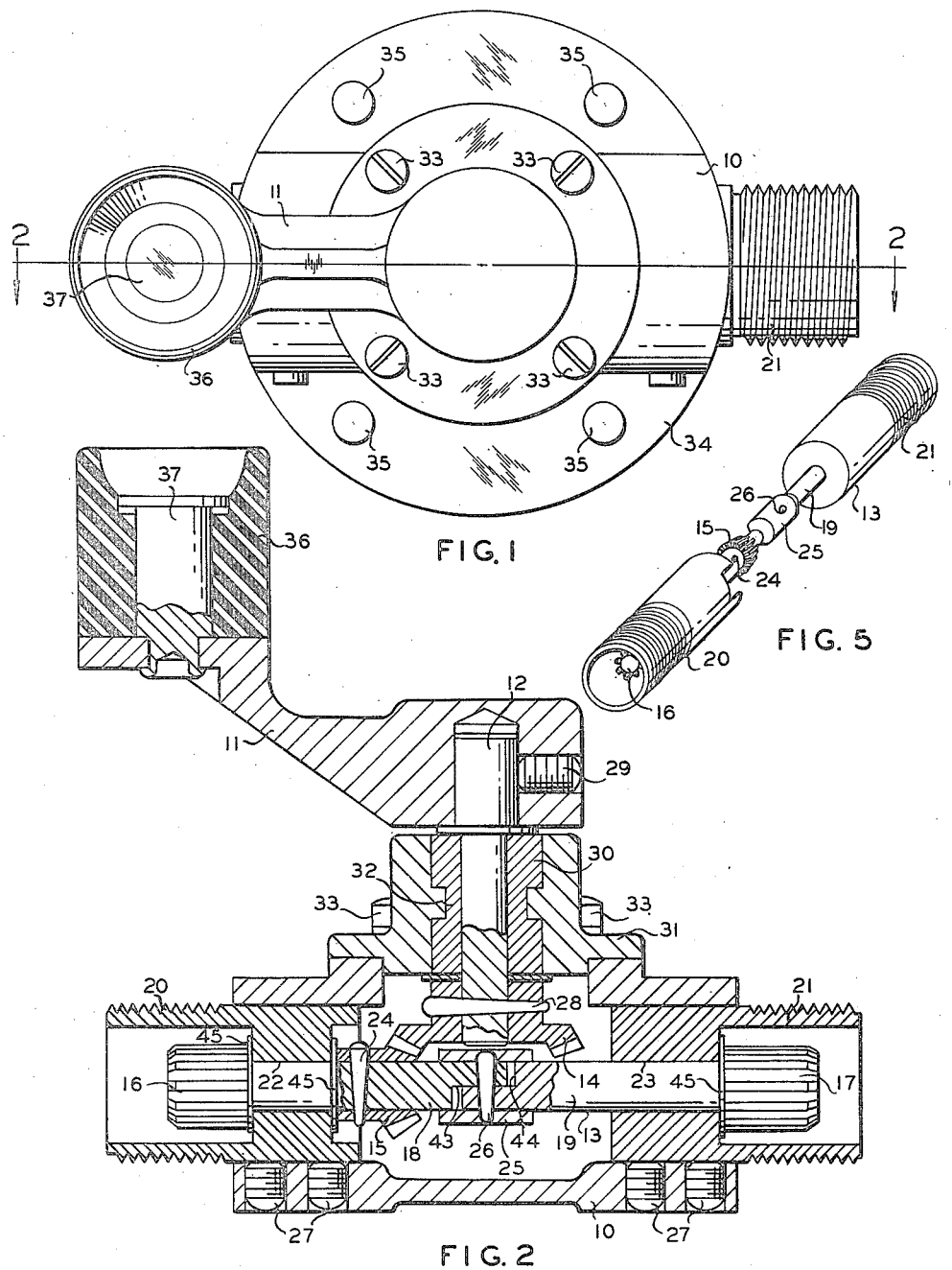

INVENTOR
LINN S. BRENNAN
BY
ATTORNEY

Patented Jan. 31, 1950

2,495,691

UNITED STATES PATENT OFFICE 2,495,691

CONTROL UNIT

Linn S. Brennan, Dayton, Ohio

Application September 12, 1945, Serial No. 615,907

1 Claim. (Cl. 74—417)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to control devices employed in the receiver systems of direction finding radio compasses, and particularly to controls for simultaneously rotating the loop and indicator of such a system.

The pilot of a vehicle equipped with a radio direction finding compass may quickly obtain a bearing with respect to a plurality of ground beacon radio transmitters by rotating the loop of the compass either to the position of minimum or maximum signal with respect to identified beacons by well known procedures. In order to remotely accomplish rotation of the loop, a hand-cranked control unit is provided. From this control unit, a pair of flexible shafts lead to the loop and an indicator, respectively, so that the position of the loop is synchronized with and revealed by the pointer of the indicator.

The mechanical arrangement of the control unit parts requires precision of manufacture to assure accurate readings at the indicator, and any misalignment or displacement of the parts can cause serious danger to the craft navigated with complete dependence on the indicator readings. It has been found that a source of serious error and inoperativeness of such a system is in the control unit due, primarily, to its mode of construction.

The control units heretofore employed were specifically designed to permit ready removal and replacement of the bevel gear section due to frequent springing of the main gear shaft which resulted in binding at the bearings and relative shifting of the gears. Such construction also employed press-fitted pinions which were staked to their shaft. Again springing of the shaft would result in the loosening of the pinions and consequent inaccurate indications or complete failure of the unit.

The present invention is an improvement over previous control units in that it eliminates the troublesome gear shaft construction of former units and provides a construction which is interchangeable with the housings of existing models. The novel construction also employs a new assembly procedure permitting rigid mounting of pinions.

Accordingly, the invention has for an object the provision of a remote control unit which is simple to manufacture, with standard or mass produced parts, efficient in use and readily interchangeable.

A further object is to provide a control unit having opposed pinions for driving a pair of flexible shafts wherein the drive pinions are rigidly mounted to withstand severe torsional stress.

Another object is to provide a main shaft assembly for such a control unit which may be accurately preassembled and be mounted or removed from the main housing as a complete, self-contained unit.

These and other objects will appear throughout the specification and will be particularly pointed out in the claim.

For a clearer understanding of the invention, reference is made to the accompanying drawings wherein:

Fig. 1 is a plan view of the novel control unit;

Fig. 2 is a vertical sectional view, the section being taken along line 2—2 of Fig. 1;

Fig. 5 is a perspective view of the composite shaft assembly prior to insertion into the housing.

Figure 3:
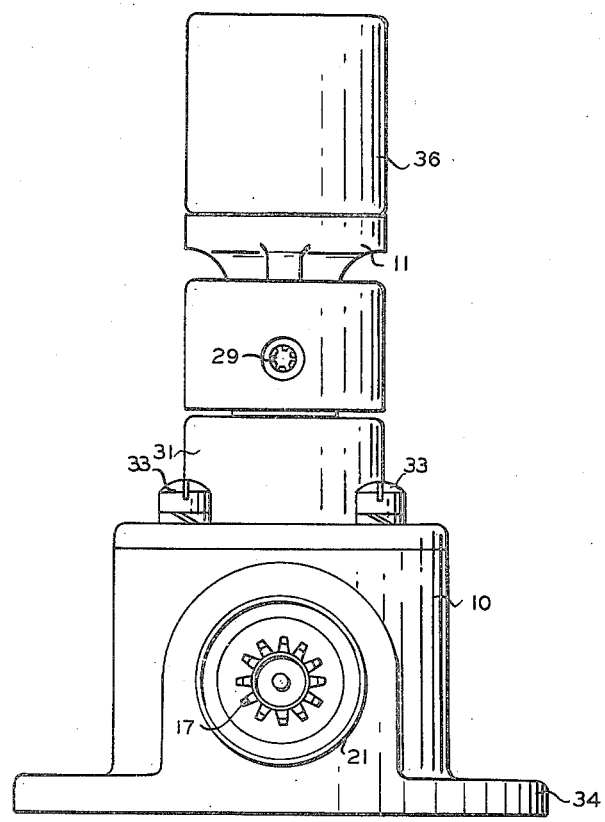
Fig. 3 is a right end elevation of the control unit shown in Fig. 1.
Figure 4:
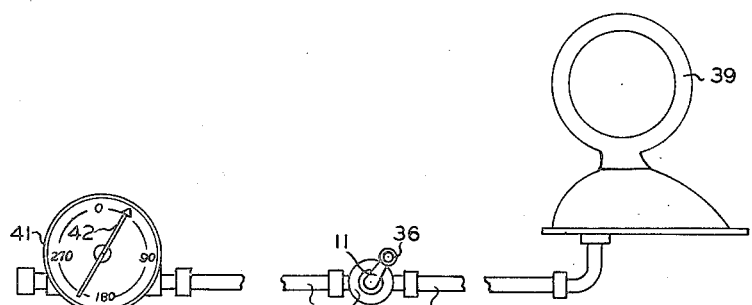
Fig. 4 is a schematic diagram to illustrate the function of the control unit in a remote controlled loop and indicator of a directional homing radio receiver system used particularly in aircraft.

Referring to the drawings, the novel control unit includes a main housing 10, a crank 11, a vertical crank shaft 12 and a horizontal driven shaft 13. Bevel gear 14 is mounted on crank shaft 12 and another bevel gear 15 in mesh therewith is pinned to driven shaft 13. Coupling members 16 and 17 are at opposite ends of shaft 13 and form the male members of a flexible shaft drive assembly. Each of these coupling members 16, 17 is inserted within a female or internal gear (not shown) mounted on the coupling end of a flexible shaft in conventional manner.

A novel feature of the unit is the spliced, or two-piece construction of the horizontal driven shaft 13, which is made of two lengths of metal rod material 18 and 19. These extend through bores in the threaded bearing members 20 and 21 which serve as the bearing surfaces for the shaft. The coupling members 16 and 17 are integral parts of the shaft members 18 and 19, and are made either from pinion stock by turning off the undesired portions of the teeth of the pinions to form the shaft portion, or by generating the teeth on the members in well known manner. This construction obviates loosening of the members 16 and 17. Such loosening occurred formerly where the coupling members were sleeved on and secured to a one-piece continuous shaft by staking or spinning, because the coupling members had to be assembled to the shaft after it was assembled and journaled in the bearings 22 and 23.

In order to assemble the shaft members 18 and 19 within their respective bearing portions 22 and 23 of the bearing members 20 and 21, bevel gear 15 is first securely assembled to shaft member 18 by taper pin 24. The mating milled surfaces at the rear of the respective shaft members 18 and 19 are then juxtaposed and locking sleeve 25 is secured over these mating portions by taper pin 26, thereby arresting flexure of the pinned joint.

In fabricating the parts of the main shaft, a nested fixture may be employed (not shown), wherein a nest is provided for each of the bearing members 20 and 21, accurately spaced to the desired distance apart, and aligned so that when in place on the jig, the bores of the bearing members are aligned. The pinion shaft members 18 and 19 are then inserted through the bores in bearing members 20 and 21 so that their respective milled sections 43 and 44 are in contact, in a horizontal plane, and resting on a V supporting block of the jig with sleeve 25 in place over the milled portions 43 and 44. The sleeve 25 and shafts 18 and 19 are then vertically drilled and taper-reamed, the taper pin 26 is then driven into the drilled and reamed hole. The shafts will be rigidly supported during these operations by the V surface of the jig and the shafts will have been accurately spaced and aligned. The gear 15 is similarly located and pinned to shaft member 18 while the parts are in the jig. Washers 45 may be included in the assembly if desired, and are assembled prior to drilling the taper pin holes. When the complete assembly shown in Fig. 5 is removed from the jig it may be assembled into housing 10 by forcing it lightly through the line bores of the housing, the outer diameter of the bearing members 20 and 21 having been made slightly smaller than the line bores.

It will be readily understood from Fig. 2, therefore, that a wide latitude in assembly procedure is permitted under accurate control by virtue of the composite construction of shaft 13, since the various parts may be jig-milled, drilled and assembled. The half-assemblies comprising coupling, shaft and pinion may be secured axially of the bored housing 10 by set-screws 27, thereby locking the main shaft assembly securely within housing 10.

The crank-shaft 12 has the bevel gear 14 pinned thereon by taper-pin 28 and is driven by crank 11 which is set-screw fastened to shaft 12 by set-screw 29. The bearing for crank shaft 12 is preferably a bronze bushing insert 30 which is cast into housing cover plate 31. It is retained against movement by the reduced collar section 32 in conventional manner. Housing cover 31 therefore carries the crank shaft assembly. After meshing together the two bevel gears 14 and 15, the cover 31 is secured to the housing 10 by screws 33. Housing 10 is provided with a flange portion 34 with screw holes 35 for mounting the control unit to a suitable support. To permit free turning action, crank 11 has mounted thereon a knob 36 which rotates freely with respect to knob pin 37, the latter being riveted to crank 11 in conventional manner.

In use, the control unit is suitably secured to a support by inserting fastening screws in screw holes 35. Flexible shafts 38 are then assembled to the bearing members 20 and 21 so that one flexible shaft connects one bearing member, for instance 17, in driving relation to the drive pinion (not shown) of antenna loop 39, and another flexible shaft 40 is attached to the other bearing member so that coupling member 16 is in driving relation with respect to the drive pinion (not shown) of azimuth or directional indicator 41. Rotating crank 11 will then simultaneously rotate loop 39 and the pointer 42 of indicator 41.

Thus, a control unit is provided, the structural parts of which may be made of die castings or plastic mouldings, and in which the bearings, shafts, gears, coupling members, and bearing members may be made of standardized or jig-made parts so that assembly may be performed with a minimum of time and skill and wherein the number of faulty units is reduced to a fraction of the number resulting in constructions not employing the present interchangeable, sleeve-mounted, solid-pinion two-piece shafts.

While the invention has been illustrated and described in its preferred embodiment, it is contemplated that changes in the details thereof may be made without departing from the spirit or scope of the invention as claimed.

Having thus described the invention, what is claimed is:

As an article of manufacture, a drive unit of the class described and comprising a crank provided with a knob, a shaft rotated by said crank, a cover plate having a bearing bushing integrally cast therein, said crank-rotated shaft being journaled in said bushing, a tubular housing having line-bored openings and an additional opening extending transversely to the axis of said line-bored openings, fastening means for removably securing said cover plate over said transverse opening, a pair of centrally bored bearing members respectively mounted in said line-bored openings, a two-piece shaft, each piece having an integrally formed coupling member, journaled in one of said bored bearing members, said shaft pieces being positioned in tandem with their inner ends overlapping and substantially semicircular in cross section for a sufficient distance to allow relative longitudinal adjustment, splicing means for demountably assembling said two-piece shaft and drive means coupling said crank shaft and said two-piece shaft for simultaneously rotating said coupling members upon rotation of said crank.

LINN S. BRENNAN.

REFERENCES CITED

The following references are of record in the file of this patent:

UNITED STATES PATENTS

| Number | Name | Date |
|---|---|---|
| 109,114 | Crouse | Nov. 8, 1870 |
| 336,783 | Bartholomew | Feb. 23, 1886 |
| 573,119 | Weiss | Dec. 15, 1896 |
| 573,779 | Gillespie | Dec. 22, 1896 |
| 1,006,169 | Wunder | Oct. 17, 1911 |
| 1,265,742 | Burrows | May 14, 1918 |
| 2,214,458 | Glamb | Oct. 10, 1940 |
| 2,301,858 | Danielson | Nov. 10, 1942 |
| 2,366,734 | Lear | Jan. 9, 1945 |